(12) United States Patent
Swaminathan et al.

(10) Patent No.: US 9,654,180 B2
(45) Date of Patent: May 16, 2017

(54) NFC-ENABLE MOBILE DEVICE, NFC READER AND NFC SYSTEM FOR SUPPORTING A PLURALITY OF PROXIMITY SERVICES

(71) Applicant: NXP B.V., Eindhoven (NL)

(72) Inventors: Sundaresan Swaminathan, Bangalore (IN); Giten Kulkarni, Bangalore (IN)

(73) Assignee: NXP B.V., Eindhoven (NL)

( * ) Notice: Subject to any disclaimer, the term of this patent is extended or adjusted under 35 U.S.C. 154(b) by 48 days.

(21) Appl. No.: 14/174,053

(22) Filed: Feb. 6, 2014

(65) Prior Publication Data

US 2014/0227972 A1 Aug. 14, 2014

(30) Foreign Application Priority Data

Feb. 13, 2013 (EP) ..................... 13155058

(51) Int. Cl.
*H04B 5/00* (2006.01)
*H04W 4/00* (2009.01)
*H04W 4/02* (2009.01)

(52) U.S. Cl.
CPC .......... *H04B 5/0031* (2013.01); *H04W 4/008* (2013.01); *H04W 4/023* (2013.01)

(58) Field of Classification Search
CPC ........ H04B 5/00; H04B 5/0031; H04W 4/008
USPC ........... 455/41.1, 41.2, 73, 558, 90.1, 185.1, 455/186.1; 340/572.1, 10.1, 10.3, 10.4, 340/10.42, 10.52
See application file for complete search history.

(56) References Cited

U.S. PATENT DOCUMENTS

| 8,229,354 B2 | 7/2012 | Sklovsky et al. |
| 2007/0233554 A1 * | 10/2007 | Sakai et al. ..................... 705/13 |
| 2010/0227553 A1 | 9/2010 | Charrat et al. |
| 2012/0092137 A1 * | 4/2012 | Buscemi et al. ........... 340/10.51 |

FOREIGN PATENT DOCUMENTS

| EP | 2 211 480 A1 | 7/2010 |
| EP | 2 503 494 A1 | 9/2012 |
| WO | 2012/065643 A1 | 5/2012 |

OTHER PUBLICATIONS

NFC Forum; "NFC Controller Interface (NCI) Specification"; Draft Technical Specification, NFC Forum, NCI 1.0, NFCForum-TS-NCI-1.0_draft25 147 pages (Jul. 11, 2012).
Extended European Search Report for Patent Appln. No. 13155058.4 (Nov. 25, 2014).

* cited by examiner

*Primary Examiner* — Tuan Pham

(57) ABSTRACT

According to an aspect of the invention, an NFC-enabled mobile device for supporting a plurality of proximity services is conceived, wherein each supported proximity service corresponds to a specific operating system running on a specific secure element comprised in the NFC-enabled mobile device, wherein the NFC-enabled mobile device comprises a plurality of data sets and each data set corresponds to a supported proximity service, wherein the NFC-enabled mobile device is arranged to determine whether it supports an advertised proximity service, upon receipt of a service advertisement message comprising a unique identifier of the advertised proximity service from an NFC reader, by searching for the advertised proximity service in said data sets.

18 Claims, 8 Drawing Sheets

| SERVICE NAME | Card OS/Emulation | SECURE ELEMENT | SERVICE KEY |
|---|---|---|---|
| Access.company.L2 | MFDF | UICC | "xxxxxxxx" |
| Print.company.L2 | MFULC | UICC | "xxxxxxxx" |
| Payment.company.mealpass | MFUL | SD CARD | "xxxxxxxx" |
| Preferences.audio.playlist | T1T | HOST CPU | NOT REQUIRED |

NFC-ENABLE MOBILE DEVICE, NFC READER AND NFC SYSTEM FOR SUPPORTING A PLURALITY OF PROXIMITY SERVICES

CROSS-REFERENCE TO RELATED APPLICATIONS

This application claims the priority under 35 U.S.C. §119 of European patent application no. 13155058.4, filed on Feb. 13, 2013, the contents of which are incorporated by reference herein.

FIELD OF THE INVENTION

The invention relates to an NFC-enabled mobile device for supporting a plurality of proximity services. Furthermore, the invention relates to an NFC reader for supporting one or more proximity services. Furthermore, the invention relates to a corresponding NFC system.

BACKGROUND OF THE INVENTION

Nowadays, NFC-enabled mobile devices are capable of offering services which traditionally have been offered by smart cards. Conventionally, dedicated smart cards were designed for a single service or a limited number of services. However, an NFC-enabled mobile device typically hosts many services, some of which may be subject to security requirements. Although it appears to the end-user that all these services are offered by a single device, there is typically a plurality of resources embedded in such a device, and each of said resources is capable of offering a particular service. More specifically, a particular service typically corresponds to a resource consisting of a specific operating system comprised in a specific secure element. The NFC-enabled mobile device may comprise many different combinations of operating systems and secure elements. In the following, some exemplary use cases will be described. For the meaning of the acronyms used herein, reference is made to the appended list of acronyms.

In a first use case scenario, an end-user explicitly selects a single service from multiple services. For example, for use in an office, a printer application stores the print spool key for a printer on an emulated MFULC Tag in his mobile phone. This printer need not be subject to strict security requirements, for example. The emulated MFULC Tag may be regarded as a secure element. The printer application stores the print spool key for a more secure printer on an emulated MFULC Tag in the UICC of his mobile phone. Work area access information and keys are stored on an emulated MFDF Tag in the UICC of his mobile phone. Car door access keys are stored on an emulated HID Tag in the UICC of his mobile phone. Car infotainment preferences are stored on an emulated MFUL Tag in his mobile phone. Furthermore, a wallet application is provisioned on a so-called "FastPay" operating system in a multi-application "SmartMX" chip in his mobile phone. Furthermore, home door access keys are stored on a MFDF Tag in the multi-application "SmartMX" chip. TV Preferences are stored on an emulated FeliCa Tag in his mobile phone. Video on Demand keys are provisioned by an STB provider on an emulated MFP Tag in the UICC of his mobile phone. Favorite playlist information for his audio system are stored on an emulated Type 1 Tag on his mobile phone. Metro prepaid ticket is stored on a emulated SCOSTA Tag on the SD Card of the mobile phone. Finally, a meal pass (canteen payment application) is stored on an emulated MFUL on the SD Card of the mobile phone.

In a second use case scenario, an end-user explicitly selects a sequence of services to complete a particular transaction. For example, a secure printer may require the following interdependent services corresponding to different combinations of operating systems and secure elements of the mobile phone. First, the user's access information stored in an emulated MFDF Tag in the UICC of his mobile phone is authenticated by an NFC reader embedded in said printer. If the authentication is successful, the NFC reader will continue to authenticate the user's print key stored in an emulated MFULC in the UICC of his mobile phone. In another example, a POS may require the following independent services corresponding to different combinations of operating systems and secure elements of the mobile phone. First, the POS authenticates and transacts with a so-called "Sodexo Pass" application stored in an SD Card of the mobile phone. Subsequently and independent thereof, the POS authenticates and transacts with a "VISA Wallet" application in a "SmartMX" chip embedded in the mobile phone. In yet another example, a car door reader may require the following interdependent services corresponding to different combinations of operating systems and secure elements of the mobile phone. First, a user's access key for opening the car, which is stored in an emulated HID Tag in the UICC of his mobile phone, is authenticated by the reader. If the authentication is successful, the reader reads car infotainment preferences stored an emulated MFUL Tag in the mobile phone.

In an NFC system NFC readers are devices which provide a means to exercise a service or services offered by smart cards or NFC-enabled mobile devices. Such NFC readers could be dedicated for offering a single service, a plurality of services or a plurality of interlinked services. An NFC reader typically scans/looks for a smart card or an NFC-enabled mobile device which comes into proximity, and which supports a specific communication protocol and operating system. When a communication channel has been established, the NFC reader uses operating system specific commands to exercise the service it is defined for, without knowing a priori whether such service is hosted by the smart card or the NFC-enabled mobile device. In the following, some exemplary NFC reader service use cases will be described.

In a first use case an NFC reader is used for accessing a transport service, such as a bus or a train. Entry and exit are defined to exercise the specific transport service present on a smart card or an NFC-enabled mobile device.

In a second use case an NFC reader which is used for office access may be defined to support multiple services, such as providing access to the printer room and presenting the print spool key to the printer, present on the smart card or the NFC Enabled device. Another example of this may be an NFC reader-based car access system exercising, on the smart card or NFC-enabled mobile device, the car access information and the user preferences for the car audio settings.

In a third use case an NFC reader used at the Point of Sale in a shop may be defined to exercise multiple interlinked services such as payment, loyalty card update and discount coupons processing, distributed over different operating systems present on the smart card or NFC-enabled mobile device.

FIG. 1A illustrates a typical NFC system comprising an NFC-enabled mobile device or a smart card hosting a service or plurality of services as described above, and an NFC reader which exercises a single service or a plurality of services.

FIG. 1B illustrates a typical system architecture of an NFC-enabled mobile device. The NFC-enabled mobile device 100 comprises an NFC controller 102, a host CPU 104, a UICC 106, an SD Card 108, non-secure Flash memory 110, secure Flash memory 112, and a "SmartMX" chip 114. The NFC-enabled mobile device 100 typically supports a plurality of services. These services are referred to as "proximity services" because they are based on NFC technology. In this context, a proximity service corresponds to a specific operating system running on a specific secure element comprised in the NFC-enabled mobile device 100. FIG. 1B clearly shows that many different combinations of operating systems and secure elements are possible. For example, two different operating systems (a "FastPay" OS and an MFDF EV1 Tag OS) may run on a single secure element (the "SmartMX" chip 114). In another example, the same operating system (an emulated MFULC Tag OS) may run on different secure elements (the UICC 106 and the secure Flash memory 112). In another example, two different operating systems (an emulated SCOSTA Tag OS and an emulated FeliCa Tag OS) may run on different secure elements (the SD Card 108 and the secure Flash memory 112). The skilled person will appreciate that a secure element may also include a combination of hardware components. For example, the host CPU 104 and the SD Card 108 together may be regarded as a single secure element.

As a result of the various combinations of operating systems and secure elements required to offer a plurality of services, several problems arise. For example, an end-user may have to select a particular proximity service on the NFC-enabled mobile device manually before tapping on to a reader, which is not convenient. Furthermore, an end-user may have to know a sequence of proximity services required to perform a certain transaction, if said transaction involves the use of multiple services. Furthermore, the NFC reader scans for the defined protocol and operating system. It does not have a means to know and activate the secure element hosting the expected service before requesting the service. An example has been described above: a POS may authenticate and transact with a so-called "Sodexo Pass" application stored in an SD Card of the mobile phone, and subsequently and independent thereof, the POS may authenticate and transact with a "VISA Wallet" application in a "SmartMX" chip embedded in the mobile phone. This may result in exposure of security-sensitive personal data of the end-user. Furthermore, the end-user must select each proximity service manually in the correct order, which is not convenient and results in a longer transaction execution time. If the proximity services in a sequence required to perform a certain transaction are interdependent, then the additional problem arises that an end-user may have to wait for a notification about the success of a first proximity service of the sequence before he/she can select a next proximity service. In general, these problems negatively affect the user experience.

SUMMARY OF THE INVENTION

It is an object of the invention to address the above-mentioned problems. More specifically, it is an object of the invention to improve the user experience of NFC-enabled mobile devices which support a plurality of proximity services. This object is achieved by an NFC-enabled mobile device as claimed in claim 1, an NFC reader as claimed in claim 13, and an NFC system as claimed in claim 15.

According to an aspect of the invention, an NFC-enabled mobile device for supporting a plurality of proximity services is conceived, wherein each supported proximity service corresponds to a specific operating system running on a specific secure element comprised in the NFC-enabled mobile device, wherein the NFC-enabled mobile device comprises a plurality of data sets and each data set corresponds to a supported proximity service, wherein the NFC-enabled mobile device is arranged to determine whether it supports an advertised proximity service, upon receipt of a service advertisement message comprising a unique identifier of the advertised proximity service from an NFC reader, by searching for the advertised proximity service in said data sets.

According to an exemplary embodiment of the invention, each data set contains a mapping of a unique identifier of a proximity service to the specific operating system and the specific secure element corresponding to said proximity service.

According to a further exemplary embodiment of the invention, the data sets are securely stored in a table.

According to a further exemplary embodiment of the invention, the NFC-enabled mobile device is arranged to determine whether it supports the advertised proximity service by searching for an entry comprising the unique identifier of the advertised proximity service in said table.

According to a further exemplary embodiment of the invention, the data sets comprise additional information, such as a service key.

According to a further exemplary embodiment of the invention, the specific operating system is an emulated smart card operating system.

According to a further exemplary embodiment of the invention, said NFC-enabled mobile device is arranged to enter into a default polling cycle if the processing of the service advertisement message is unsuccessful.

According to a further exemplary embodiment of the invention, said NFC-enabled mobile device is further arranged to determine whether or not the service advertisement message has expired and to process the service advertisement message only if the service advertisement message has not expired.

According to a further exemplary embodiment of the invention, said NFC-enabled mobile device is further arranged to delete the service advertisement message and to return to a default polling cycle if the service advertisement message has expired.

According to a further exemplary embodiment of the invention, said NFC-enabled mobile device is further arranged to send a service supported message to the NFC reader, wherein the service supported message indicates whether the NFC-enabled mobile device supports the advertised proximity service.

According to a further exemplary embodiment of the invention, said NFC-enabled mobile device is further arranged to activate the advertised proximity service if it has determined that it supports the advertised proximity service after it has processed the service advertisement message and has terminated a corresponding service advertisement protocol.

According to a further exemplary embodiment of the invention, the service advertisement message advertises a sequence of interrelated proximity services, and wherein the NFC-enabled mobile device is further arranged to activate the advertised sequence of interrelated proximity services.

According to a further aspect of the invention, an NFC reader for supporting one or more proximity services is conceived, said NFC-reader being arranged to communicate with an NFC-enabled mobile device of the kind set forth, and further being arranged to send a service advertisement message comprising one or more unique identifiers of advertised proximity services to the NFC-enabled mobile device.

According to a further exemplary embodiment of the invention, the service advertisement message advertises a sequence of interrelated proximity services.

According to a further aspect of the invention, an NFC system is conceived which comprising an NFC-enabled mobile device and an NFC reader of the kind set forth.

According to a further exemplary embodiment of the invention, the NFC-enabled mobile device and the NFC reader are arranged to execute a service advertisement protocol in order to prepare the NFC-enabled mobile device and NFC reader for proximity service execution.

According to a further exemplary embodiment of the invention, the service advertisement protocol is executed via near field communication.

According to a further exemplary embodiment of the invention, the service advertisement protocol involves the exchange of messages according to an NDEF syntax or a proprietary syntax.

BRIEF DESCRIPTION OF THE DRAWINGS

The invention will be described in more detail with reference to the appended drawings, in which.

DESCRIPTION OF EMBODIMENTS

Figure 1A:
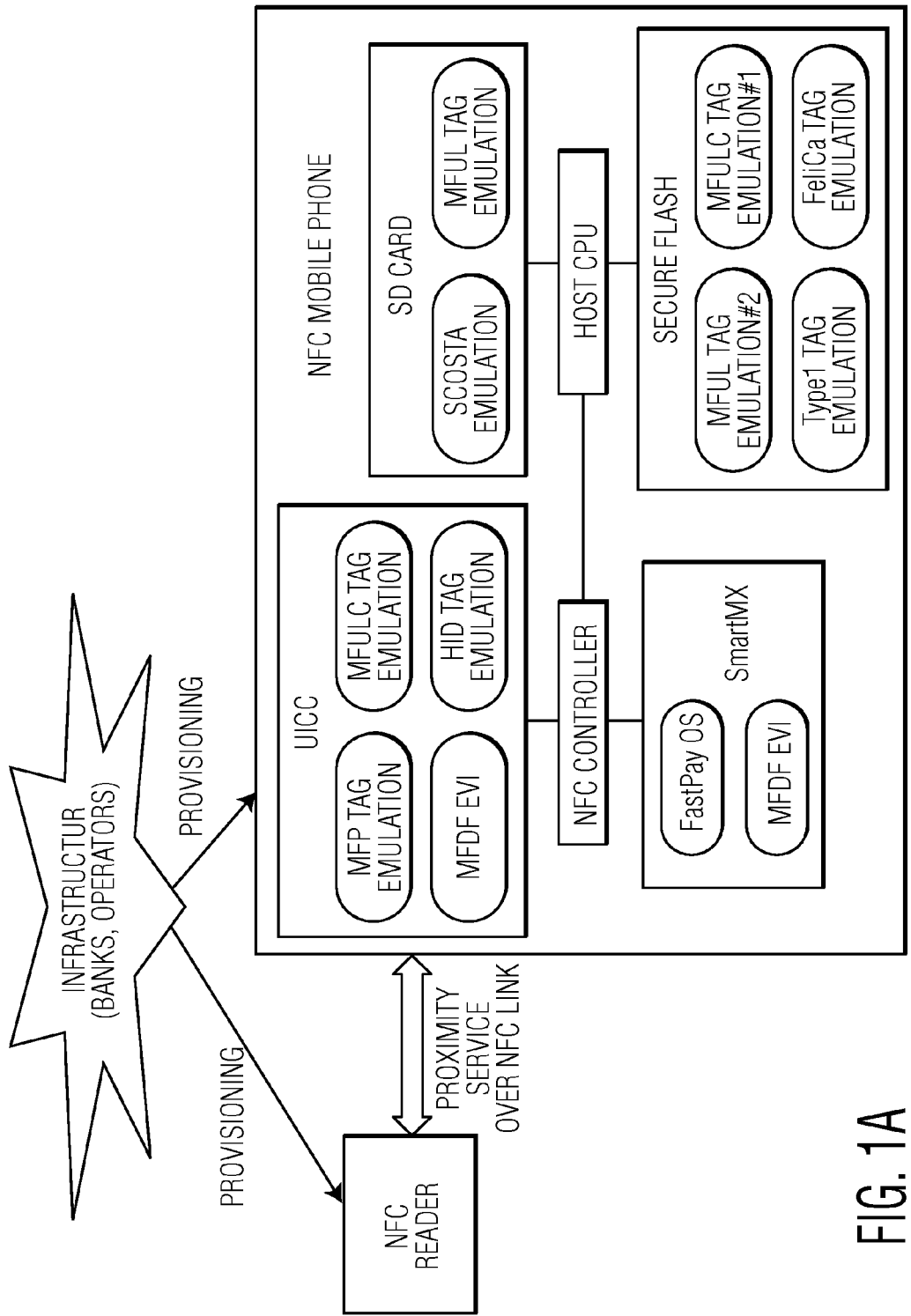
FIG. 1A illustrates a typical NFC system.

FIG. 1A illustrates a typical NFC system comprising an NFC-enabled mobile device or a smart card hosting a service or plurality of services, and an NFC reader which exercises a single service or a plurality of services.

Figure 1B:
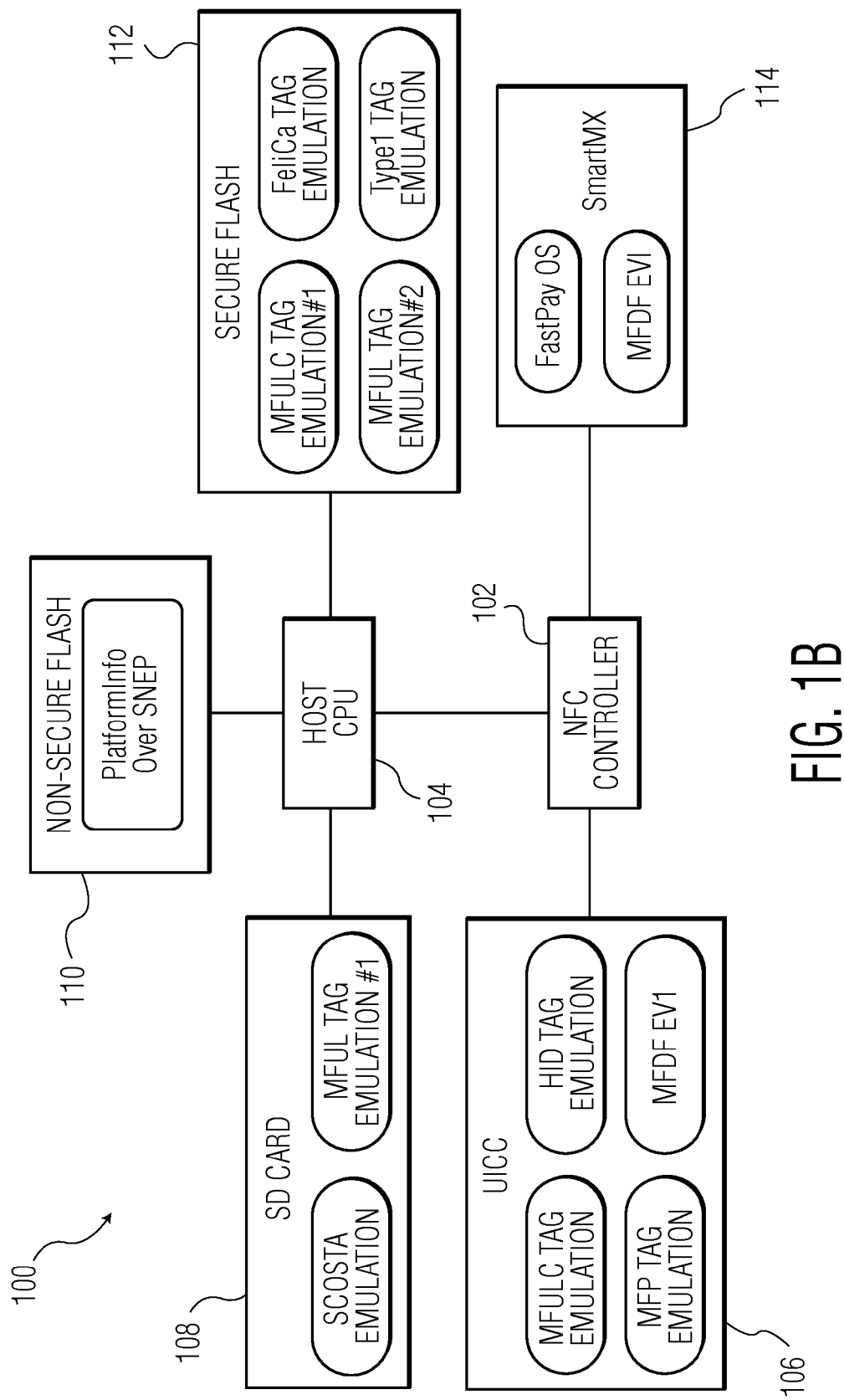
FIG. 1B illustrates a typical system architecture of an NFC-enabled mobile device.

FIG. 1B illustrates, as described above, a typical system architecture of an NFC-enabled mobile device. The NFC-enabled mobile device 100 comprises an NFC controller 102, a host CPU 104, a UICC 106, an SD Card 108, non-secure Flash memory 110, secure Flash memory 112, and a "SmartMX" chip 114. The NFC-enabled mobile device 100 typically supports a plurality of services. These services are referred to as "proximity services" because they are based on NFC technology. In this context, a proximity service corresponds to a specific operating system running on a specific secure element comprised in the NFC-enabled mobile device 100.

Figure 2:
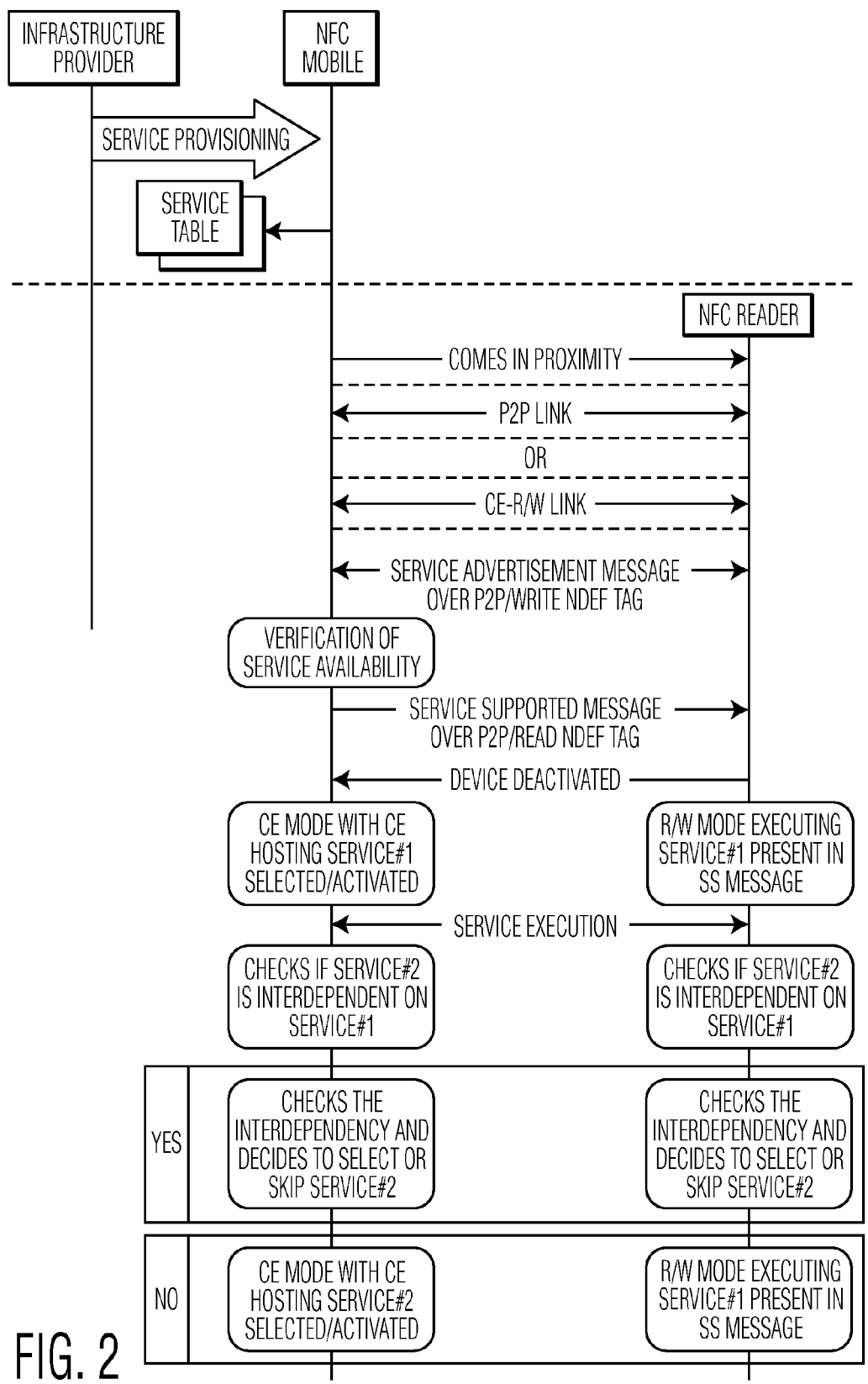
FIG. 2 illustrates a provisioning of proximity services in an NFC-enabled mobile device and a subsequent determination of whether the NFC-enabled mobile device supports a particular proximity service in accordance with an exemplary embodiment of the invention.

FIG. 2 illustrates a provisioning of proximity services in an NFC-enabled mobile device and a subsequent determination of whether the NFC-enabled mobile device supports a particular proximity service in accordance with an exemplary embodiment of the invention. As described above, each proximity service corresponds to a specific operating system running on a specific secure element comprised in the NFC-enabled mobile device. Proximity services are provisioned by an infrastructure provider (IP). The IP, or an independent entity such as the NFC Forum, assigns a unique identifier to the proximity service. Optionally, the IP assigns a service key to the proximity service, which service key enables secure communication with an NFC reader when said proximity service has been activated. Subsequently, an entry is made in a table, i.e. a service table, comprised in the NFC-enabled mobile device. This entry maps the identifier of the proximity service to the service provision, i.e. the corresponding operating system and the corresponding secure element. The entry may be stored securely.

For example, a Pay TV provider provisions a VoD service identified by "access.tatasky.vod" or "10.52.1". In another example, an IT service provider provisions a print service identified by "access.nxp.printL2". In a further example, a financial provider provisions a wallet service identified by "payment.visa.creditcard" or "payment.visa.loyalty". In a further example, a company finance provider provisions a Sodexho service identified by "payment.sodexho.mealpass". In a further example, a car seller provisions a card-door-key service and a car-infotainment service identified by "access.car.mainkey" and "preferences.car.infotainment", respectively. Thus, the identifier of the proximity service may among others comprise a string of characters forming a name which reveals the type of proximity service.

The NFC-enabled mobile device is arranged to receive a service advertisement message from an NFC reader. The service advertisement message comprises at least one identifier of a proximity service. The NFC-enabled mobile device is further arranged to determine whether it supports a proximity service identified by said identifier. For example, the NFC-enabled mobile device may use the above-mentioned table for this purpose. Thus, according to an exemplary embodiment, the NFC-enabled mobile device comprises a table which specifies, for each proximity service supported by the NFC-enabled mobile device, the specific operating system and the specific secure element corresponding to said proximity service. The NFC-enabled mobile device may determine whether it supports a particular proximity service by searching for an entry comprising the identifier of the particular proximity service in said table.

Figures 3, 4:
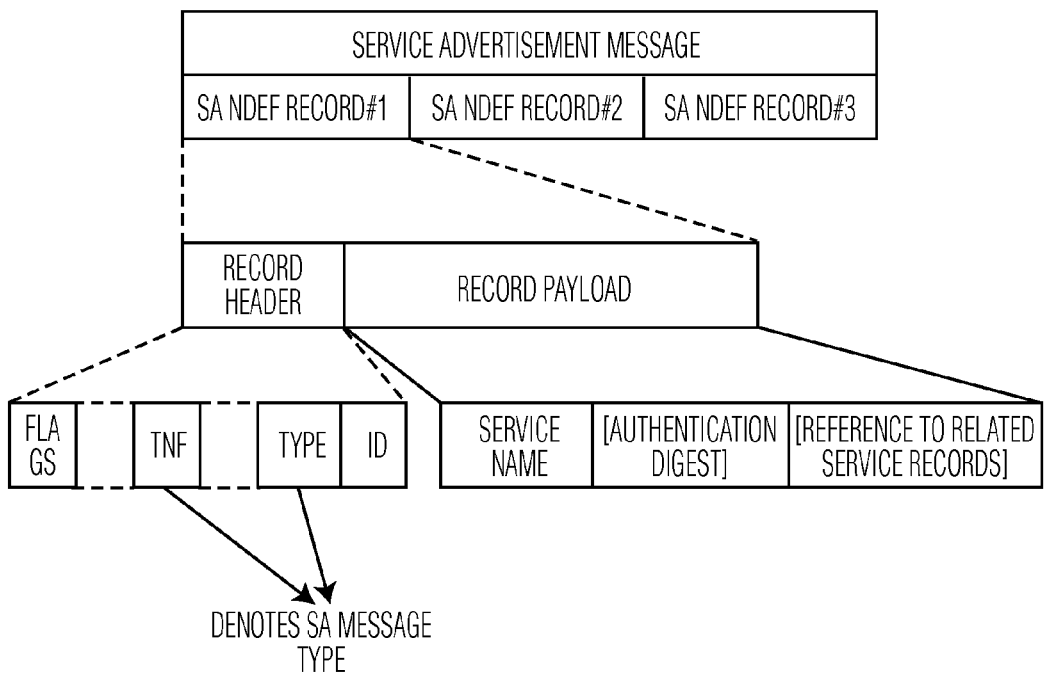
FIG. 3 illustrates a table comprised in an NFC-enabled mobile device according to an exemplary embodiment of the invention.
FIG. 4 illustrates a service advertisement message according to an exemplary embodiment of the invention.

FIG. 3 illustrates a table comprised in an NFC-enabled mobile device according to an exemplary embodiment of the invention. The table comprises four entries. The first entry maps a proximity service identified by "Access.company.L2" to an emulated MFDF Tag in the UICC 106 of the NFC-enabled mobile device 100. The first entry also specifies a service key for the proximity service. The second entry maps a proximity service identified by "Print.company.L2" to an emulated MFULC Tag in the UICC 106 of the NFC-enabled mobile device 100. The second entry also specifies a service key for the proximity service. The third entry maps a proximity service identified by "Payment.company.mealpass" to an emulated MFUL Tag in the SD Card 108 of the NFC-enabled mobile device 100. The third entry also specifies a service key for the proximity service. The fourth entry maps a proximity service identified by "Preferences.audio.playlist" to an emulated T1T in the host CPU 104 of the NFC-enabled mobile device 100. The fourth entry does not specify a service key for the proximity service.

FIG. 4 illustrates a service advertisement message according to an exemplary embodiment of the invention. The SA message contains one or more SA NDEF records. Each SA NDEF record contains an identifier of a proximity service. Thus, an SA message effectively contains one or more proximity service identifiers. Optionally, an SA NDEF record contains authentication data which may be used to authenticate a proximity service. Also, an SA NDEF record may contain a reference to one or more related proximity services advertised within the SA message. The SA message is sent by the NFC reader to the NFC-enabled mobile device. The NFC-enabled mobile device may acknowledge receipt of the SA message. The skilled person will appreciate that formats different from NDEF, for example proprietary formats, may also be used. In response to the SA message, the NFC-enabled mobile device may send a service supported message to the NFC reader. The SS message indicates whether the NFC-enabled mobile device supports the proximity service(s) identified by the one or more proximity service identifiers. Thus, the SS message effectively informs the NFC reader on the availability of the requested proximity service(s).

The SA message may be transported using a protocol (referred to as "service transport protocol" such as NFCDEP or a tag-type specific protocol, for example a protocol specific to T1T, T2T, T3T and T4T. In case NFCDEP is used, the protocol may further be implemented using LLCP, SNEP or a specially designed service advertisement protocol. Alternatively, raw NFCDEP may be used, involving NFCDEP data exchanges which do not carry payload in a format prescribed, for example, by LLCP. If one of the protocols specific to T1T, T2T, T3T and T4T is used, the NFC reader will operate in R/W mode and the NFC-enabled mobile device will operate in CE mode. Alternatively, the SA message may be transported using any other transport protocol established directly or indirectly between the NFC reader and the NFC-enabled mobile device.

An NFC reader in poll mode acts either in R/W mode or as an NFCDEP Initiator. An NFC reader in listen mode acts as an NFC-DEP Target. An NFC reader in R/W mode is capable of detecting a tag emulation implemented by an NFC-enabled mobile device. Furthermore, an NFC reader in R/W mode is capable of writing an SA NDEF message to an emulated tag. An NFC reader in NFCDEP Initiator or Target mode is capable of detecting the service transport protocol implemented by an NFC-enabled mobile device and of transmitting the SA NDEF message using said service transport protocol or an alternative protocol, as mentioned above.

An NFC-enabled mobile device which supports SA message reception over NFCDEP may use one of the following non-limiting implementations: LLCP, SNEP, a specially designed service advertisement protocol or raw NFCDEP. An NFC-enabled mobile device may support one of the following non-limiting tag emulations: T1T, T2T, T3T, T4T or a proprietary tag emulation. A tag emulation which supports a proximity service will typically contain an NDEF SA record, and the NDEF state of the tag emulation will be writable. The NFC reader writes the SA NDEF message to the emulated tag. Subsequently, the NFC-enabled mobile device processes the SA NDEF message and determines whether it supports the proximity service. Furthermore, the NFC-enabled mobile device may send an SS message to the NFC reader. Subsequently, the NFC reader may read the SS message and change the NDEF state of the tag emulation to read-only. Also, the NFC reader switches to the R/W mode if it is not already in that mode.

According to an exemplary embodiment, the NFC-enabled mobile device may be arranged to activate a proximity service after sending an SS message which indicates that the NFC-enabled mobile device supports said proximity service. Furthermore, the NFC-enabled mobile device may be arranged to enter into a default polling cycle if the processing of the SA message is unsuccessful. In the default polling cycle, the NFC-enabled mobile device waits for a new SA message.

According to a further exemplary embodiment, the NFC-enabled mobile device may be arranged to determine whether the SA message has not expired and to process the SA message only if the SA message has not expired. For example, an SA message received by an NFC-enabled mobile device may be valid from the moment it is received to the moment that whichever is earlier the NFC-enabled mobile device is out of RF field generated by the NFC reader for more than a predetermined number of seconds, the NFC-enabled mobile device in CE mode encounters exceptions, the NFC-enabled mobile device in CE mode completes all proximity services, the user of the NFC-enabled mobile device closes the NFC connection, the NFC reader sets up a P2P link with the NFC-enabled mobile device, and the NFC-enabled mobile device switches out of the CE mode. Furthermore, the NFC-enabled mobile device may delete the SA message and return to a default polling cycle if the SA message has expired.

Figure 5:
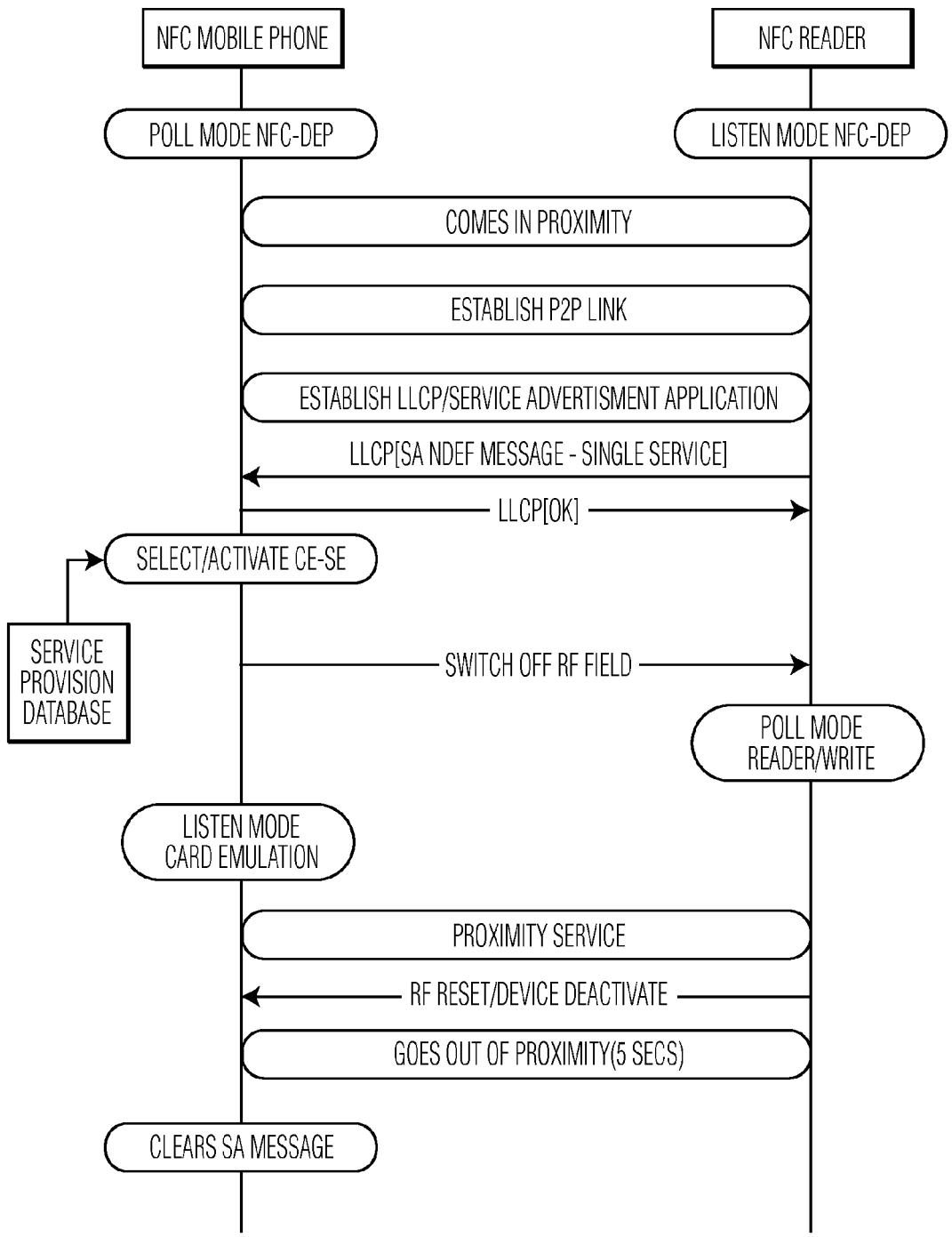
FIG. 5 illustrates how a single proximity service is advertised and executed in case the NFC-enabled mobile device starts in NFCDEP poll mode.

FIG. 5 illustrates how a single proximity service is advertised and executed in case the NFC-enabled mobile device starts in NFCDEP poll mode. An NFC reader sends only one proximity service identifier in an SA message. The NFC-enabled mobile device processes the SA NDEF record, determines whether it supports the proximity service identified by said proximity service identifier, and if it does support it, it may activate the corresponding specific operating system on the specific secure element. It is noted that the NFC-enabled mobile device does not need to respond to the SA message with an SS message in case a single proximity service is advertised, but it may simply activate said proximity service in response to the SA message.

Figure 6:
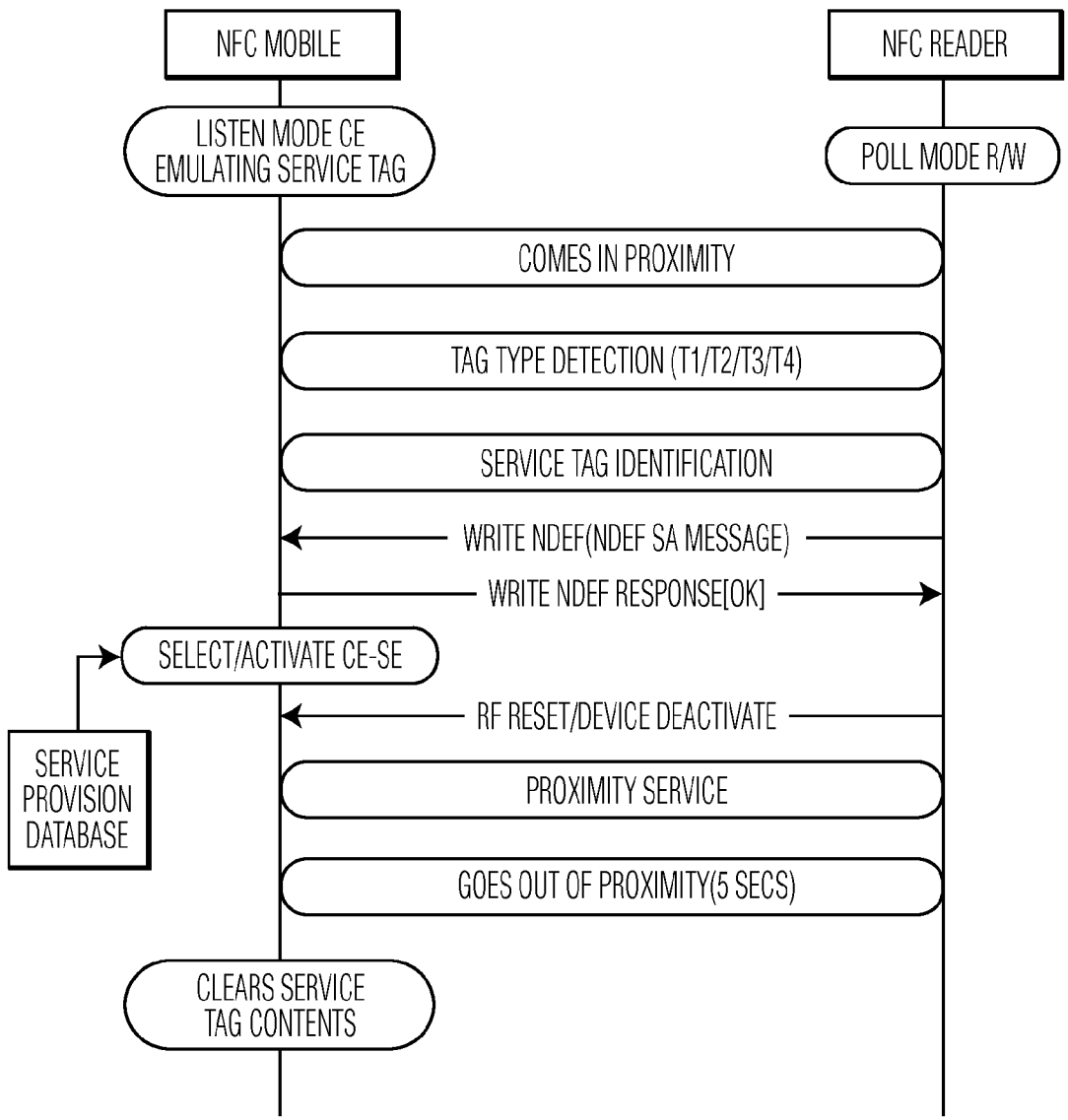
FIG. 6 illustrates how a single proximity service is advertised and executed in case the NFC-enabled mobile device starts in CE listen mode.

FIG. 6 illustrates how a single proximity service is advertised and executed in case the NFC-enabled mobile device starts in CE listen mode. Again, an NFC reader sends only one proximity service identifier in an SA message. The NFC-enabled mobile device processes the SA NDEF record, determines whether it supports the proximity service identified by said proximity service identifier, and if it does support it, it may activate the corresponding specific operating system on the specific secure element.

Figure 7:
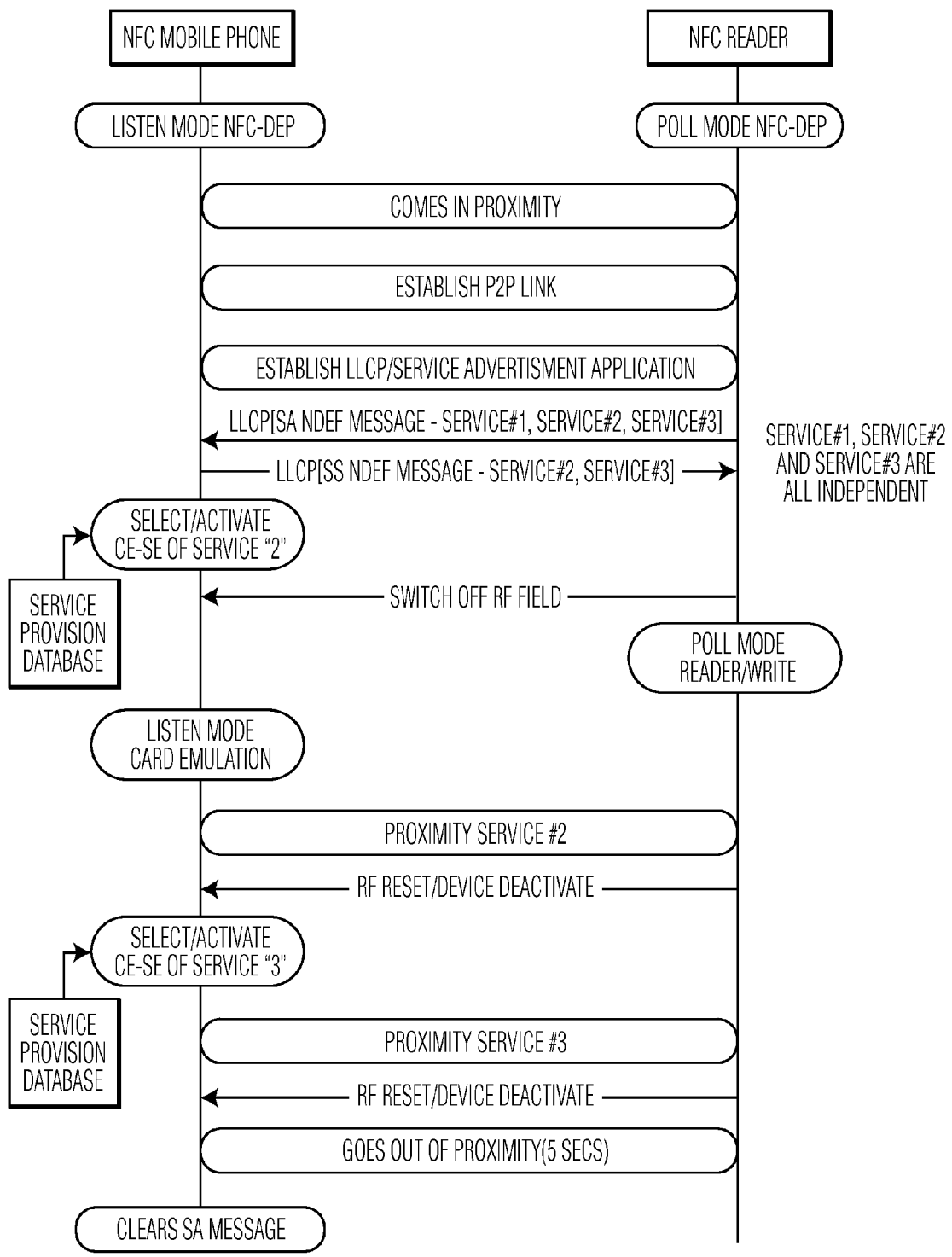
FIG. 7 illustrates how multiple proximity services are advertised and executed in case the NFC-enabled mobile device starts in NFCDEP listen mode.

FIG. 7 illustrates how multiple proximity services are advertised and executed in case the NFC-enabled mobile device starts in NFCDEP listen mode. The NFC-enabled mobile device selects specific operating systems and specific secure elements corresponding to the proximity services of a service sequence. The SS message acknowledges the service sequence. If the NFC-enabled mobile device does not support SS messages for the advertisement of multiple services, it may use another mechanism to synchronize with the NFC reader. If the NFC reader receives an SS message from the NFC-enabled mobile device, it follows the service sequence contained in the SS message. If the NFC reader does not receive an SS message from the NFC-enabled mobile device, it follows the service sequence contained in the SA message. In this case, the proximity services Service#1, Service#2 and Service#3 are independent.

Figure 8:
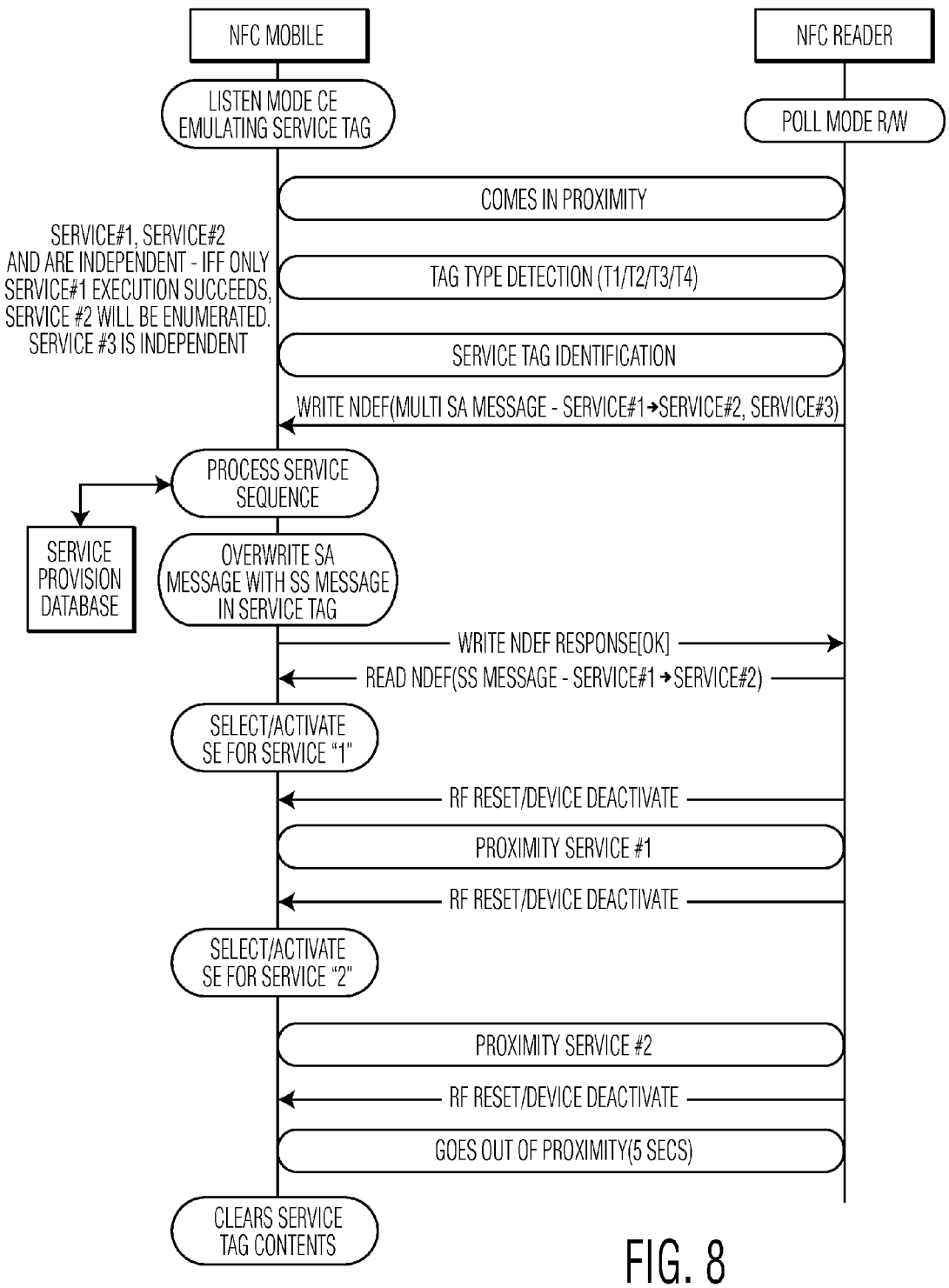
FIG. 8 illustrates how multiple proximity services are advertised and executed in case the NFC-enabled mobile device starts in CE listen mode.

FIG. 8 illustrates how multiple proximity services are advertised and executed in case the NFC-enabled mobile device starts in CE listen mode. Again, the NFC-enabled mobile device selects specific operating systems and specific secure elements corresponding to the proximity services of a service sequence. In this case, the proximity services Service#1 and Service#2 are interdependent, and the proximity service Service#3 is independent. Only if the execution of the proximity service Service#1 succeeds, the proximity service Service#2 will follow.

It is noted that the drawings are schematic. Furthermore, it is noted that in an effort to provide a concise description of the exemplary embodiments, implementation details which fall into the customary practice of the skilled person may not have been described. It should be appreciated that in the development of any such implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill.

The above-mentioned embodiments illustrate rather than limit the invention, and the skilled person will be able to design many alternative embodiments without departing from the scope of the appended claims. In the claims, any reference sign placed between parentheses shall not be construed as limiting the claim. The word "comprise(s)" or "comprising" does not exclude the presence of elements or steps other than those listed in a claim. The word "a" or "an" preceding an element does not exclude the presence of a plurality of such elements. The invention may be implemented by means of hardware comprising several distinct elements and/or by means of a suitably programmed processor. In a device claim enumerating several means, several of these means may be embodied by one and the same item of hardware. The mere fact that certain measures are recited in mutually different dependent claims does not indicate that a combination of these measures cannot be used to advantage.

LIST OF REFERENCE NUMBERS

100 NFC-enabled mobile device
102 NFC controller
104 Host CPU
106 UICC
108 SD Card
110 Non-Secure Flash
112 Secure Flash
114 SmartMX chip

LIST OF ACRONYMS

CE Card Emulation
CPU Central Processing Unit
HID Refers to products from vendor "HID Global"
LLCP NFC Logical Link Control Protocol
MFDF MIFARE DESfire
MFDF EV1 MIFARE DESFire EV1
MFUL MIFARE Ultralight
MFULC MIFARE Ultralight C
MFP MIFARE Plus
NCI NFC Controller Interface
NDEF NFC Data Exchange Format
NFC Near Field Communication
NFCDEP NFC Data Exchange Protocol
NFCIP1 Near Field Communication Interface and Protocol-1
OS Operating System
P2P Peer-to-Peer
POS Point of Sale
SCOSTA Smart Card Operating System Standard for Transport Application
SA Service Advertisement
SD Secure Digital
SE Secure Element
SIM Subscriber Identity Module
SNEP Simple NDEF Exchange Protocol
STB Set-Top Box
SS Service Supported
SWP Single Wire Protocol
T1T NFC Forum Type 1 Tag
T2T NFC Forum Type 2 Tag
T3T NFC Forum Type 3 Tag
T4T NFC Forum Type 4 Tag
UICC Universal Integrated Circuit Card
USIM Universal Subscriber Identity Module
VOD Video on Demand

The invention claimed is:

1. An NFC-enabled mobile device configured to support a plurality of proximity services, the NFC-enabled mobile device comprising:
   a plurality of secure elements, wherein each supported proximity service of the plurality of proximity services corresponds to a specific operating system running on a specific secure element; and
   a service table comprising a plurality of data sets, wherein each data set of the plurality of data sets corresponds to a supported proximity service, and the NFC-enabled mobile device is configured to determine whether it supports an advertised proximity service, upon receipt of a service advertisement message comprising a unique identifier of the advertised proximity service from an NFC reader, by searching for the advertised proximity service in said plurality of data sets in the service table.

2. The NFC-enabled mobile device as claimed in claim 1, wherein each data set contains a mapping of the unique identifier of the proximity service to the specific operating system and the specific secure element corresponding to said proximity service.

3. The NFC-enabled mobile device as claimed in claim 2, wherein the data sets are securely stored in the service table.

4. The NFC-enabled mobile device as claimed in claim 3, wherein the NFC-enabled mobile device is configured to determine whether it supports the advertised proximity service by searching for an entry comprising the unique identifier of the advertised proximity service in said service table.

5. The NFC-enabled mobile device as claimed in claim 1, wherein the data sets comprise a service key.

6. The NFC-enabled mobile device as claimed in claim 1, wherein the specific operating system is an emulated smart card operating system.

7. The NFC-enabled mobile device as claimed in claim 1, wherein said NFC-enabled mobile device is configured to enter into a default polling cycle if the processing of the service advertisement message is unsuccessful.

8. The NFC-enabled mobile device as claimed in claim 1, wherein said NFC-enabled mobile device is further configured to determine whether or not the service advertisement message has expired and to process the service advertisement message only if the service advertisement message has not expired.

9. The NFC-enabled mobile device as claimed in claim 8, wherein said NFC-enabled mobile device is further configured to delete the service advertisement message and to return to a default polling cycle if the service advertisement message has expired.

10. The NFC-enabled mobile device as claimed in claim 1, further being configured to send a service supported message to the NFC reader, wherein the service supported message indicates whether the NFC-enabled mobile device supports the advertised proximity service.

11. The NFC-enabled mobile device as claimed in claim 1, further being configured to activate the advertised proximity service if it has determined that it supports the advertised proximity service after it has processed the service advertisement message and has terminated a corresponding service advertisement protocol.

12. The NFC-enabled mobile device as claimed in claim 1, wherein the service advertisement message advertises a sequence of interrelated proximity services, and wherein the NFC-enabled mobile device is further configured to activate the advertised sequence of interrelated proximity services.

13. An NFC reader for supporting one or more proximity services, said NFC-reader being configured to communicate with the NFC-enabled mobile device as claimed in claim 1, and further being configured to send a service advertisement message comprising one or more unique identifiers of advertised proximity services to the NFC-enabled mobile device.

14. The NFC reader as claimed in claim 13, wherein the service advertisement message advertises a sequence of interrelated proximity services.

15. An NFC system comprising the NFC-enabled mobile device as claimed in claim 1 and an NFC reader for supporting one or more proximity services, said NFC-reader being configured to communicate with the NFC-enabled mobile device, and further being configured to send a service advertisement message comprising one or more unique identifiers of advertised proximity services to the NFC-enabled mobile device.

16. The NFC system as claimed in claim 15, wherein the NFC-enabled mobile device and the NFC reader are configured to execute a service advertisement protocol in order to prepare the NFC-enabled mobile device and NFC reader for proximity service execution.

17. The NFC system as claimed in claim 16, wherein the service advertisement protocol is executed via near field communication.

18. The NFC system as claimed in claim 16, wherein the service advertisement protocol involves the exchange of messages according to an NDEF syntax or a proprietary syntax.

* * * * *